US008972614B2

(12) United States Patent
Peled

(10) Patent No.: US 8,972,614 B2
(45) Date of Patent: Mar. 3, 2015

(54) HALF-DUPLEX SATA LINK WITH CONTROLLED IDLE GAP INSERTION

(75) Inventor: Arie Peled, Tel Mond (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/560,105

(22) Filed: Jul. 27, 2012

(65) Prior Publication Data

US 2013/0166780 A1 Jun. 27, 2013

Related U.S. Application Data

(60) Provisional application No. 61/580,259, filed on Dec. 26, 2011.

(51) Int. Cl.
*G06F 3/00* (2006.01)
(52) U.S. Cl.
USPC .............................................. 710/5
(58) Field of Classification Search
None
See application file for complete search history.

(56) References Cited

U.S. PATENT DOCUMENTS

| 5,546,543 | A   | * | 8/1996  | Yang et al. ............... 709/235 |
| 7,404,013 | B1  |   | 7/2008  | Masiewicz |
| 7,516,237 | B2  | * | 4/2009  | Booth et al. .............. 709/232 |
| 7,773,635 | B2  | * | 8/2010  | Eichinger et al. ......... 370/478 |
| 8,116,330 | B2  |   | 2/2012  | Keeley et al. |
| 2003/0056000 | A1 | * | 3/2003 | Mullendore et al. ...... 709/236 |
| 2004/0057447 | A1 | * | 3/2004 | Fukunaga et al. ......... 370/412 |
| 2008/0152024 | A1 |   | 6/2008 | Takeuchi |
| 2008/0232278 | A1 |   | 9/2008 | Brunel et al. |
| 2010/0042756 | A1 | * | 2/2010 | Ogawa ......................... 710/28 |
| 2012/0290861 | A1 | * | 11/2012 | Chen et al. ................. 713/320 |
| 2013/0010613 | A1 | * | 1/2013 | Cafarelli et al. .......... 370/250 |

* cited by examiner

*Primary Examiner* — Elias Mamo
(74) *Attorney, Agent, or Firm* — Meyertons, Hood, Kivlin, Kowert & Goetzel, P.C.

(57) ABSTRACT

A method includes receiving in a storage device multiple commands from a host, and sending responses to the commands from the storage device to the host, over a half-duplex link that does not enable simultaneous transmission by the host and by the storage device. An idle gap is inserted between two of the responses, during which the host has priority to send one or more subsequent commands on the half-duplex link.

22 Claims, 2 Drawing Sheets

HALF-DUPLEX SATA LINK WITH CONTROLLED IDLE GAP INSERTION

CROSS-REFERENCE TO RELATED APPLICATIONS

This application claims the benefit of U.S. Provisional Patent Application No. 61/580,259, filed Dec. 26, 2011, whose disclosure is incorporated herein by reference.

FIELD OF THE INVENTION

The present invention relates generally to data storage, and particularly to methods and systems for communication between a storage device and a host.

BACKGROUND OF THE INVENTION

Various storage protocols for communicating between storage devices and hosts are known in the art. One example storage protocol is the Serial Advanced Technology Attachment (SATA) protocol that is used, for example, in mass storage equipment such as hard disks and Solid State Drives (SSDs). The SATA protocol is specified, for example, in "Serial ATA International Organization: Serial ATA Revision 3.0," Jun. 2, 2009, which is incorporated herein by reference.

SUMMARY OF THE INVENTION

An embodiment of the present invention that is described herein provides a method, which includes receiving in a storage device multiple commands from a host, and sending responses to the commands from the storage device to the host, over a half-duplex link that does not enable simultaneous transmission by the host and by the storage device. An idle gap is inserted between two of the responses, during which the host has priority to send one or more subsequent commands on the half-duplex link.

In some embodiments, inserting the idle gap includes evaluating in the storage device a condition with respect to the commands, and inserting the idle gap upon meeting the condition. Evaluating the condition may include predicting a starvation scenario in which the host is blocked from sending the subsequent commands due to the responses that are sent over the half-duplex link.

Additionally or alternatively, evaluating the condition may include assessing a number of the commands that are pending for execution in the storage device. In an embodiment, evaluating the condition includes inserting the idle gap upon detecting that the number of the commands pending for execution is smaller than a threshold. In another embodiment, evaluating the condition includes detecting an indication that is sent from the host to indicate that the host is ready to transmit a subsequent command.

In some embodiments, receiving the commands and sending the responses include communicating with the host in accordance with a Serial Advanced Technology Attachment (SATA) protocol. In an embodiment, the method includes executing the received commands in a pipelined process so as to avoid accumulation of processing latency in the storage device. In another embodiment, the method includes executing the subsequent commands at least partly in parallel with sending the responses to the host. In a disclosed embodiment, the method includes adaptively setting a size of the idle gap depending on a condition related to the commands.

There is additionally provided, in accordance with an embodiment of the present invention, a storage device including a memory, a host interface and a processor. The host interface is configured for communication with a host over a half-duplex link that does not enable simultaneous transmission by the host and by the storage device. The processor is configured to receive from the host via the host interface multiple commands for execution in the memory, to send via the host interface responses to the commands from the storage device to the host, and to insert between two of the responses an idle gap, during which the host has priority to send one or more subsequent commands on the half-duplex link.

There is further provided, in accordance with an embodiment of the present invention, a data storage system including a host and a storage device that is connected to the host by a half-duplex link. The half-duplex link does not enable simultaneous transmission by the host and by the storage device. The storage device is configured to receive from the host multiple commands for execution in a memory of the storage device, to send to the host responses to the commands, and to insert between two of the responses an idle gap, during which the host has priority to send one or more subsequent commands on the half-duplex link.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for communication between a host and a storage device. The embodiments described herein refer mainly to the SATA protocol, but the disclosed techniques can be used in any other suitable storage protocol.

The SATA protocol defines a half-duplex link between a host and a storage device, over which the host sends commands to the storage device and the storage device sends responses to the host. The frames exchanged between the host and the storage device are referred to as Frame Information Structures (FIS).

Since the link is half-duplex, the host and the storage device cannot transmit simultaneously. Arbitration over the half-duplex link is defined in SATA such that the storage device has priority over the host in case of contention. If the storage device and the host request transmission simultaneously, the storage device wins the arbitration and the host de-asserts its request.

The SATA specification defines a Native Command Queuing (NCQ) mode in which the host can maintain up to thirty-two outstanding commands to a given storage device. This mode is highly efficient in terms of performance and latency: When the host issues a sequence of commands, the storage device may execute the commands and send the corresponding responses in a pipelined manner. Thus, the processing latency of the storage device is incurred only once.

In practice, however, the priority given to the storage device on the half-duplex link may cause starvation in the host and result in high overall latency: When the storage device sends a sequence of successive responses to the host, this sequence takes priority on the half-duplex link, and the host may be blocked from issuing subsequent commands until the sequence of responses ends. When eventually the host is granted access to the link and gets the opportunity to send the next command, the processing latency of the storage device is incurred again.

In some embodiments of the present invention, the storage device avoids such starvation scenarios by inserting idle gaps between some of the responses. During the idle gaps, the host has priority to transmit on the half-duplex link. Thus, the idle gaps give the host an opportunity to send one or more subsequent commands without waiting until the end of the sequence of responses. As a result, the processing latency of the storage device is not incurred again, and the overall system latency is reduced.

In some embodiments, the storage device inserts an idle gap conditionally, upon meeting a predefined condition related to the commands. The condition may consider, for example, the number of commands that are currently pending for execution in the storage device, or detection of an X_RDY (ready to transmit) indication from the host.

System Description

Figure 1:
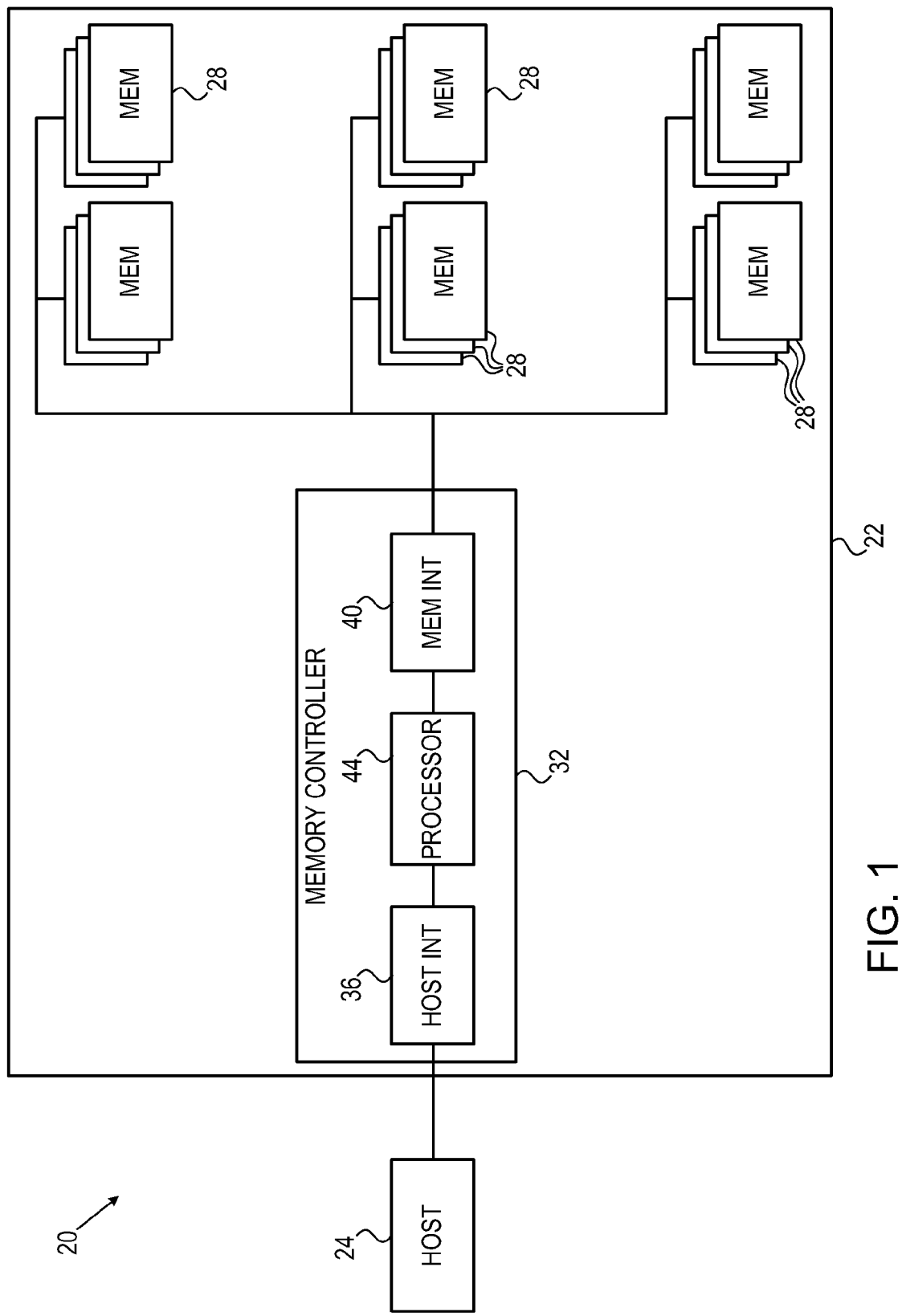
FIG. 1 is a block diagram that schematically illustrates a memory system, in accordance with an embodiment of the present invention.

FIG. 1 is a block diagram that schematically illustrates a data storage system 20, in accordance with an embodiment of the present invention. System 20 comprises a storage device 22 and a host 24. Storage device 22 accepts data for storage from host 24 and stores it in memory, and retrieves data from memory and provides it to the host. In the present example, storage device 22 and host 24 communicate with one another in accordance with the SATA specification, cited above.

In various embodiments, storage device 22 may comprise, for example, a Solid State Drive (SSD) that stores data for a personal or mobile computing device or an enterprise system, or a Micro-Secure Digital (μSD) card that stores data for a cellular phone, media player, digital camera or other host. In alternative embodiments, storage device 22 may be used in any other suitable application in which data is stored and retrieved and with any other suitable host.

Storage device 22 comprises multiple memory units 28. In the present example, each memory unit 28 comprises a respective Flash die that comprises multiple non-volatile analog memory cells. The memory cells may comprise, for example, NAND Flash cells, NOR or Charge Trap Flash (CTF) Flash cells, phase change RAM (PRAM, also referred to as Phase Change Memory—PCM) cells, Nitride Read Only Memory (NROM) cells, Ferroelectric RAM (FRAM) and/or magnetic RAM (MRAM) cells, or any other suitable memory technology.

In the present context, the term "analog memory cell" is used to describe any memory cell that holds a continuous, analog value of a physical parameter, such as an electrical voltage or charge. Any suitable type of analog memory cells, such as the types listed above, can be used. In the present example, each memory unit 28 comprises a non-volatile memory of NAND Flash cells. The charge levels stored in the cells and/or the analog voltages or currents written into and read out of the cells are referred to herein collectively as analog values or storage values.

Storage device 22 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

The memory cells are typically arranged in rows and columns. Typically, a given memory unit comprises multiple erasure blocks (also referred to as memory blocks), i.e., groups of memory cells that are erased together. In various embodiments, each memory unit 28 may comprise a packaged device or an unpackaged semiconductor chip or die. Generally, storage device 22 may comprise any suitable number of storage devices of any desired type and size.

Storage device 22 comprises a memory controller 32, which accepts data from host 24 and stores it in memory units 28, and retrieves data from the memory units and provides it to the host. Memory controller 32 comprises a host interface 36 for communicating with host 24 using SATA, a memory interface 40 for communicating with memory units 28, and a processor 44 that processes the stored and retrieved data. For example, processor 44 may encode the data for storage with an Error Correction Code (ECC) and decode the ECC of data read from memory. The functions of processor 44 can be implemented, for example, using software running on a suitable Central Processing Unit (CPU), using hardware (e.g., state machine or other logic), or using a combination of software and hardware elements.

Memory controller 32, and in particular processor 44, may be implemented in hardware. Alternatively, the memory controller may comprise a microprocessor that runs suitable software, or a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. For example, in some embodiments two or more memory controllers 32 may be connected to the same host. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory units 28 and memory controller 32 are implemented as separate Integrated Circuits (ICs). In alternative embodiments, however, the memory units and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the memory units are disposed. Further alternatively, some or all of the functionality of memory controller 32 can be implemented in software and carried out by host 24, or by any other type of memory controller. In some embodiments, host 24 and Memory controller 32 may be fabricated on the same die, or on separate dies in the same device package.

Efficient Sata NCQ Operation using IDLE GAP Insertion

In accordance with the SATA protocol, host 24 may issue multiple commands for execution by storage device 22, and the storage device may execute the commands in any desired order. The link connecting host 24 and host interface 36 of storage device 22 is half-duplex, meaning that either the host or the storage device can transmit FIS over the link at any given time. When contention occurs, storage device 22 gets priority over host 24 in transmitting on the half-duplex link.

This operating environment may give rise to starvation scenarios, in which the host is unable to transmit commands to the storage device for extended periods of time. Starvation of this sort may increase the overall command execution latency considerably. The embodiments described herein prevent host starvation by using idle gap insertion.

Figure 2:
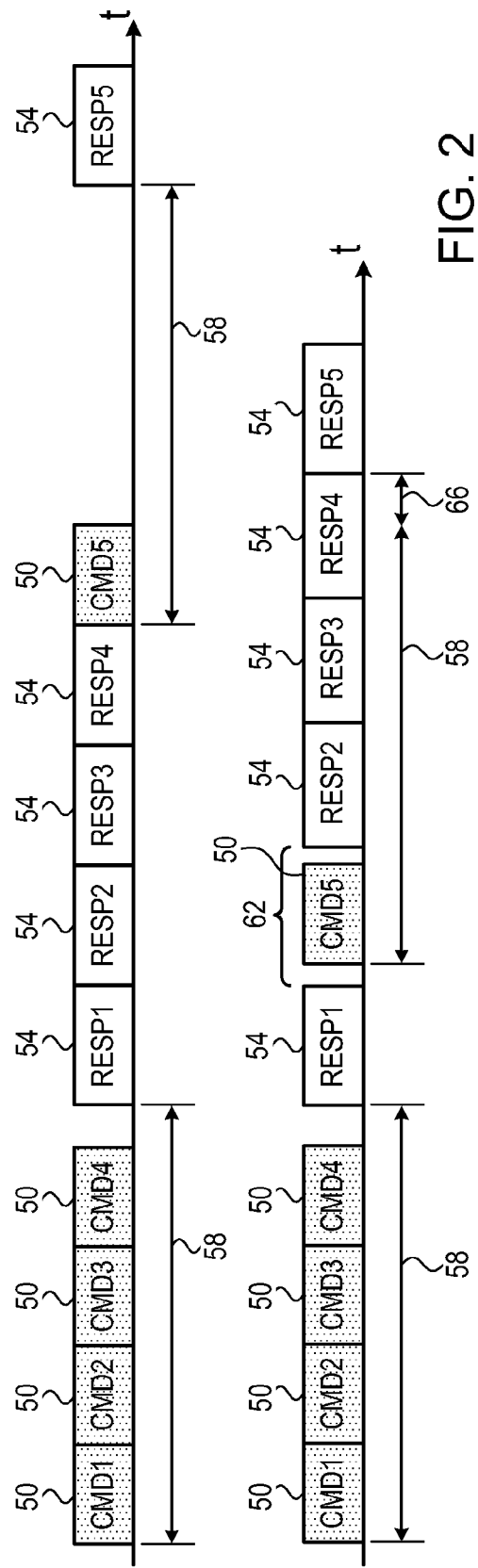
FIG. 2 is a timing diagram that schematically illustrates communication between a host and a storage device over a half-duplex link, in accordance with an embodiment of the present invention.

FIG. 2 is a timing diagram that schematically illustrates communication between host 24 and storage device 22 over a half-duplex SATA link, in accordance with an embodiment of the present invention. The top diagram in FIG. 2 shows an example starvation scenario, as a reference. The bottom diagram in FIG. 2 shows how starvation is prevented by the use of an idle gap.

Consider first the top diagram in FIG. 2. In this example, host 24 sends to storage device 22 a sequence of four commands 50 for execution in the memory device. The commands may comprise, for example, read commands, write commands and/or any other suitable type of command. The four commands are denoted CMD1 . . . CMD4, respectively.

Storage device 22 executes commands CMD1 . . . CMD4 and returns responses 54, denoted RESP1 . . . RESP4, respectively. The responses may comprise, for example, data that is retrieved from memory devices 28 in response to read commands, acknowledgements in response to write commands, and/or any other suitable type of response. In the present example the storage device sends the responses in the same order as the commands. This order, however, is not mandatory, since the SATA specification permits out-of-order command execution.

The processing latency of storage device 22 is marked in the processing .58 figure by an arrow from the, duplex link-latency is measured on the half beginning of a given command until the beginning of the corresponding response. As can be seen in the figure, since the storage device executes the commands in a pipelined manner, processing latency 58 is incurred only once in the sequence and does not accumulate. Once the latency is incurred, the four responses RESP1 . . . RESP4 are sent successively.

Consider, however, the case where host 24 has a fifth command denoted CMD5 to execute in the sequence. After command CMD4 is sent, host 24 is denied access to the half-duplex link because storage device 22 begins to send RESP1 . . . RESP4. (As explained above, the storage device has priority over the host in case of contention on the link.) The host is prevented from sending CMD5 during the sequence of responses, and is granted access to the link only after the end of RESP4. Only then the host sends CMD5. Because of this starvation, processing latency 58 of storage device 22 is incurred again, and RESP5 is sent after a considerable delay.

The bottom diagram of FIG. 2 shows an example solution to starvation scenarios of this sort, in accordance with an embodiment of the present invention. In this example, processor 44 of storage device 22 inserts an idle gap 62 into the sequence of responses, between RESP1 and RESP2. In other words, processor 44 delays RESP2 and sends it only after a gap 62 following the end of RESP1. Idle gap 62 is typically on the order of several microseconds, although any other suitable gap size can be used.

During idle gap 62, the half-duplex link is not used by storage device 24. Host 24 therefore has an opportunity to send the next command (CMD5) during the idle gap. As a result, storage device 22 may execute CMD5 in parallel with sending RESP2 . . . RESP4. In other words, the storage device processing latency is not incurred again. Processing latency 58 of CMD5, which starts at the beginning of CMD5, ends shortly before the end of RESP4. After a short additional time 66, RESP4 ends and storage device 22 sends RESP5.

As can be seen by comparing the two diagrams of FIG. 2, the idle gap mechanism reduces the overall latency of executing CMD1 . . . CMD5 considerably.

The scenarios shown in FIG. 2 are example scenarios, which are chosen purely for the sake of conceptual clarity. In alternative embodiments, the idle gap insertion technique can be used in various other scenarios and in any other suitable way in order to avoid starvation in host 24. For example, the size of idle gap 62 can be designed to accommodate any desired number of commands, and not necessarily a single command as shown in FIG. 2.

In some embodiments, processor 44 inserts an idle gap between responses conditionally, i.e., upon meeting a certain predefined condition related to the commands. For example, processor 44 may evaluate the number of commands that are currently pending for execution, and decide to insert an idle gap based on this number.

In an example embodiment, processor 44 compares the number of pending commands (tags) to a threshold. If the number of pending tags is smaller than the threshold, processor 44 inserts an idle gap, e.g., following the next response. This solution aims to provide storage device 22 with a sufficiently-large number of pending commands at any given time, so as to ensure efficient execution.

In some embodiments, processor 44 sets the size of idle gap 62 adaptively, in accordance with a predefined criterion relating to the commands. For example, processor 44 may set the size of the idle gap depending on the difference between the number of currently-pending commands and the maximum permitted number of commands (thirty-two in SATA NCQ).

As another example, processor 44 may detect an X_RDY (transmit ready) primitive that is sent from the host so as to indicate that the host is ready to transmit a subsequent command. Processor 44 may decide to insert an idle gap in response to detecting the X_RDY primitive. Additionally or alternatively, processor 44 may insert the idle gap in response to meeting any other suitable condition. In some embodiments, the condition aims to predict that host starvation is imminent.

Figure 3:
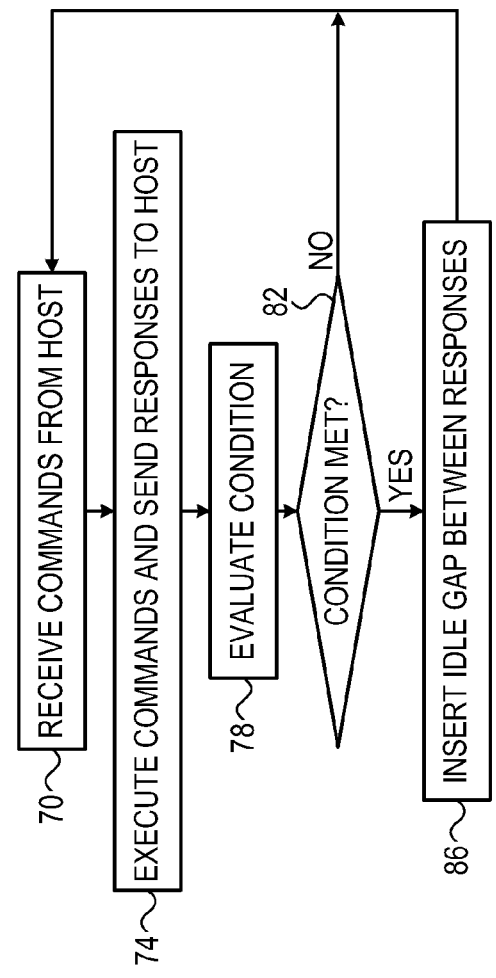
FIG. 3 is a flow chart that schematically illustrates a method for communication between a host and a storage device over a half-duplex link, in accordance with an embodiment of the present invention.

FIG. 3 is a flow chart that schematically illustrates a method for communication between host 24 and storage device 22 over a half-duplex SATA link, in accordance with an embodiment of the present invention. The method begins with processor 44 of memory controller 32 in storage device 22 receiving commands from host 24 over the half-duplex link via host interface 36, at a command reception step 70.

Processor 44 executes the commands in memory units 28 via memory interface 40, and sends responses to host 24 over the half-duplex link via host interface 36, at a response transmission step 74.

Processor 44 evaluates a predefined condition for deciding whether to insert an idle gap between the responses, at a condition evaluation step 78. As noted above, processor 44 may assess the number of pending commands, detect the arrival of an X_RDY primitive from the host, or evaluate any other suitable condition.

If the condition is not met, as checked at a condition checking step 82, the method loops back to step above and processor 44 continues to receive and execute commands from the host. If the condition is met at step 83, processor 44 inserts an idle gap between two of the responses, at a gap insertion step 86. The method then loops back to step 70 above.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving in a storage device multiple commands from a host; and
   sending responses to the received commands from the storage device to the host, over a half-duplex link that does not enable simultaneous transmission by the host and by the storage device;
   inserting between two of the responses an idle gap, during which the host has priority to send one or more subsequent commands on the half-duplex link; and
   setting a size of the idle gap dependent upon a difference between a number of pending commands and a predetermined maximum number of commands, wherein inserting the idle gap comprises evaluating in the storage device a condition with respect to the commands, and inserting the idle gap upon meeting the condition.

2. The method according to claim 1, wherein evaluating the condition comprises predicting a starvation scenario in which the host is blocked from sending the subsequent commands due to the responses that are sent over the half-duplex link.

3. The method according to claim 1, wherein evaluating the condition comprises assessing a number of the commands that are pending for execution in the storage device.

4. The method according to claim 3, wherein evaluating the condition comprises inserting the idle gap upon detecting that the number of the commands pending for execution is smaller than a threshold.

5. The method according to claim 1, wherein evaluating the condition comprises detecting an indication that is sent from the host to indicate that the host is ready to transmit a subsequent command.

6. The method according to claim 1, wherein receiving the commands and sending the responses comprise communicating with the host in accordance with a Serial Advanced Technology Attachment (SATA) protocol.

7. The method according to claim 1, and comprising executing the received commands in a pipelined process so as to avoid accumulation of processing latency in the storage device.

8. The method according to claim 1, and comprising executing the subsequent commands at least partly in parallel with sending the responses to the host.

9. The method according to claim 1, and comprising adaptively setting a size of the idle gap depending on a condition related to the commands.

10. A storage device, comprising:
    a memory;
    a host interface, for communication with a host over a half-duplex link that does not enable simultaneous transmission by the host and by the storage device; and
    a processor, which is configured to:
    receive from the host via the host interface multiple commands for execution in the memory;
    send via the host interface responses to the received commands from the storage device to the host; and
    insert between two of the responses an idle gap, during which the host has priority to send one or more subsequent commands on the half-duplex link; and
    set a size of the idle gap dependent upon a difference between a number of pending commands and a predetermined maximum number of pending commands, wherein the processor is configured to evaluate a condition with respect to the commands, and to insert the idle gap upon meeting the condition.

11. The storage device according to claim 10, wherein the condition predicts a starvation scenario in which the host is blocked from sending the subsequent commands due to the responses that are sent over the half-duplex link.

12. The storage device according to claim 10, wherein the processor is configured to evaluate the condition by assessing a number of the commands that are pending for execution in the storage device.

13. The storage device according to claim 12, wherein the processor is configured to insert the idle gap upon detecting that the number of the commands pending for execution is smaller than a threshold.

14. The storage device according to claim 10, wherein the processor is configured to evaluate the condition by detecting an indication that is sent from the host to indicate that the host is ready to transmit a subsequent command.

15. The storage device according to claim 10, wherein the processor is configured to receive the commands and to send the responses in accordance with a Serial Advanced Technology Attachment (SATA) protocol.

16. The storage device according to claim 10, wherein the processor is configured to execute the received commands in a pipelined process so as to avoid accumulation of processing latency in the storage device.

17. The storage device according to claim 10, wherein the processor is configured to execute the subsequent commands at least partly in parallel with sending the responses to the host.

18. The storage device according to claim 10, wherein the processor is configured to adaptively set a size of the idle gap depending on a condition related to the commands.

19. A data storage system, comprising:
    a host; and
    a storage device, which is connected to the host by a half-duplex link that does not enable simultaneous transmission by the host and by the storage device, wherein the storage device is configured to:
    receive from the host multiple commands for execution in a memory of the storage device;
    send to the host responses to the received commands; and
    insert between two of the responses an idle gap, during which the host has priority to send one or more subsequent commands on the half-duplex link; and
    set a size of the idle gap dependent upon a difference between a number of pending commands and a maximum number of pending commands, wherein the storage device is configured to evaluate a condition with respect to the commands, and to insert the idle gap upon meeting the condition.

20. The system according to claim 19, wherein the condition predicts a starvation scenario in which the host is blocked from sending the subsequent commands due to the responses that are sent over the half-duplex link.

21. The system according to claim 19, wherein the storage device is configured to evaluate the condition by assessing a number of the commands that are pending for execution in the storage device.

22. The system according to claim 19, wherein the storage device is configured to evaluate the condition by detecting an indication that is sent from the host to indicate that the host is ready to transmit a subsequent command.

* * * * *